July 11, 1972 P. W. McKINNEY 3,676,040
APPARATUS FOR PRODUCING TRIMMED PRINTING FACE PLATES
Filed Sept. 14, 1970
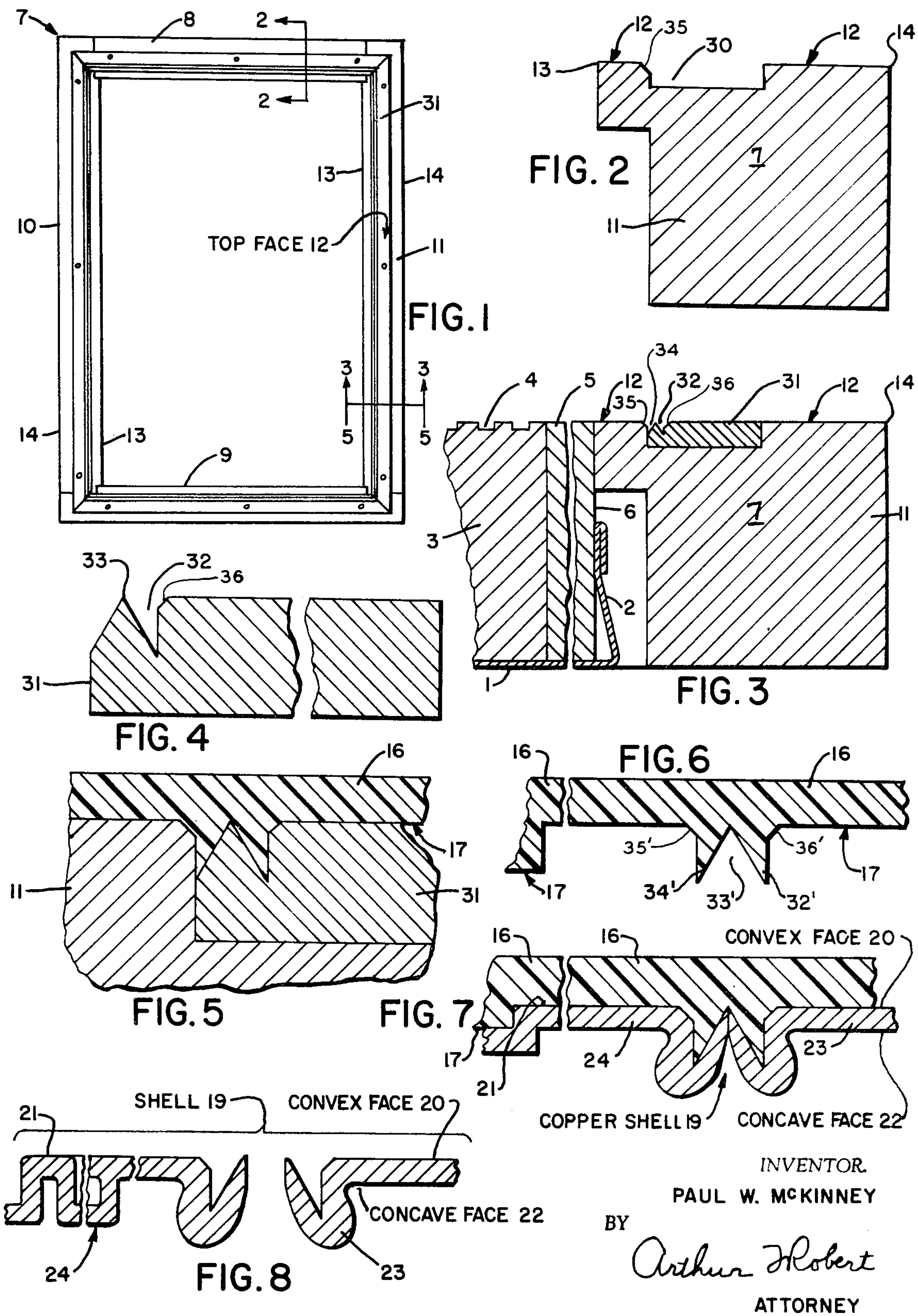
INVENTOR.
PAUL W. McKINNEY
BY Arthur J. Robert
ATTORNEY United States Patent Office 3,676,040
Patented July 11, 1972

3,676,040

APPARATUS FOR PRODUCING TRIMMED PRINTING FACE PLATES

Paul W. KcKinney, Louisville, Ky., assignor to The Fawcett Printing Corporation, Louisville, Ky.

Filed Sept. 14, 1970, Ser. No. 71,846
Int. Cl. B29c *17/00*
U.S. Cl. 425—470 3 Claims

ABSTRACT OF THE DISCLOSURE

In preparing a copper face plate of precise length and width for use in producing an electrotype printing plate, a copper shell of greater length and width is electrolytically deposited upon a molded plastic impression of the pattern face of the original or starting form (i.e. the type-form, containing a positive pattern of the subject matter to be printed, and the adjacent front face of the original mold frame, which encircles the type-form). In the preferred embodiment of the invention, the front face of my mold frame is provided with an endless groove which also encircles the type-form and which is more or less centered on a "boundary" path accurately reproducing said precise length and width boundaries of the copper face plate.

This endless groove is cross-sectionally contoured to form a pair of narrow valleys separated by a sharp ridge, which is precisely located along said boundary path to reproduce said boundaries accurately. Accordingly, when a negative plastic impression is taken over the pattern face of the starting form, the endless groove causes a corresponding projection to be formed on the impression while the sharp ridge in that groove causes a steep valley to be formed in that projection. Now, when the plastic impression is conductively coated and electroplated, the thickness of the copper "shell" will inherently be reduced along that deep valley and that thickness reduction will center sharply on the bottom of that valley. As a result, during the stripping operation, when the plastic sheet and shell are separated from each other, the excess margin and the copper face plate portions of the shell can be contemporaneously separated from each other by tearing the shell along the center of the line of reduced thickness. As a consequence, said copper face plate will have the precise length and width desired. This eliminates the normally requisite operations of separately trimming each margin of the copper shell.

BACKGROUND OF THE INVENTION

Field of the invention

This invention relates to the electrotyping art and, more particularly, to the production of electrotype printing plates through the use of sheet plastic molds.

Description of the prior art

In preparing a printing face plate of precise length and width for an electrotype printing plate, one practice heretofore conventionally employed has been as follows: (1) provide an original or starting form composed of a type-form and a surrounding mold frame, the type-form containing a positive pattern of the subject matter to be printed; (2) take a plastic impression of the pattern face of the original form, using a thin plastic sheet to provide a negative reproduction on the pattern-indented face of the sheet; (3) coat the indented face of the plastic impression to render it electrically conductive; (4) electrolytically deposit, on the coated face of the impression, a copper shell having a length and width greater than said precise length and width of said printing face plate; (5) strip the shell from the plastic impression; and (6) then trim the shell to separate its excess length and width margins from the copper face plate portion of the shell. The trimming operation requires four accurate positioning and shearing operations in order to center the print pattern relative to the edges of the copper face plate portion and to provide such portion with edges of the precise length and width desired. These operations must be manually performed in a careful manner and which correspondingly take the time of expensive labor.

SUMMARY OF THE INVENTION

Objects of the invention

The principal object of the invention is to provide a simple and inexpensive improvement facilitating the rapid reproduction of a copper face plate which is accurately trimmed to precisely located length and width boundaries. Another important object of the invention is to provide a simple and inexpensive change in the plastic impression of the original pattern face which enables the trimming operation to be accurately performed contemporaneously with the operation of separating the shell from the plastic mold.

Statement of the invention

The present invention resides in providing the plastic impression with means operative, during the electroplating operation, for substantially reducing the thickness of the copper shell deposit on the plastic impression along one or more lines, which accurately reproduce one or more of the precisely located boundaries desired in the copper face plate. A substantial thickness reduction makes the copper shell so mechanically weak along the line of the reduction, that the excess margin of the shell can be contemporaneously torn off during the process of stripping (and thus removing) the shell from the plastic mold. When all four margins are thus removed, the conventional trimming operation is completely eliminated.

BRIEF DESCRIPTION OF THE DRAWINGS

The preferred embodiment of my invention is illustrated in the accompanying drawings wherein:

FIG. 1 is a plan view of a mold frame constructed in accordance with my invention;

FIG. 2 is an enlarged sectional view taken along line 2—2 of FIG. 1 but omitting the mold frame insert 31, which is seen in FIG. 3;

FIG. 3 is an enlarged sectional view taken along line 3—3 of FIG. 1, this view additionally including a portion of the galley, type-form and bearer member, all of which are omitted from both FIGS. 1 and 2;

FIG. 4 is an enlarged section of the mold frame insert shown in FIG. 3;

FIG. 5 is an enlarged fragmentary sectional view taken along line 5—5 of FIG. 1 but additionally showing a marginal portion of a plastic sheet as it appears when the sheet is pressed into conformation with the pattern face of the starting form, i.e. the type-face of the type-form, the top face of the bearer member and the corresponding top-face of a mold frame, which embodies my invention);

FIG. 6 shows the marginal plastic sheet portion of FIG. 5 after the plastic sheet has been removed from the molding apparatus;

FIG. 7 shows the plastic sheet of FIG. 6 after that sheet has been treated to render it conductive and then electroplated with a copper shell of desired average thickness generally and of reduced thickness along the trim line or boundary line of the face plate portion of the shell; and FIG. 8 is a fragmentary sectional view of the electrodeposited copper shell of FIG. 7 after that shell has been stripped from the mold and its excess margin contemporaneously separated from its copper face plate portion along the trim line of the face plate.

DESCRIPTION OF THE PREFERRED EMBODIMENT

Conventional structure

Galley mold-frame assembly.—In producing flat or arcuate electrotype printing plates, ready for the press, it is customary to start with a galley mold-frame assembly comprising: a shallow tray or galley 1 having upright perimetric walls 2; a type-form 3 arranged on the tray with its type-face 4 up; a bearer 5 arranged on the tray 1 with its inner vertical wall engaging the perimeter of the type-form 3 and a vertically-open mold-frame 7 of rectangular "window-frame" shape having the lower portion of its rectangular bore wall cut away or reduced and thereby spaced from the outer wall 6 of the bearer 5 to receive (therebetween) the upright rim 2 of the tray 1, the unreduced upper portion of the mold-frame 7 engaging the upper portion of the outer wall 6 of the bearer 5.

The galley 1 and its perimetric walls 2, the type-form 3 and its type-face 4, and the bearer 5 are seen only in FIG. 3 where only a fragmentary porition of each is shown. The type-face 4 of the type-form 3 contains the subject matter which is to be reproduced in the printing face of the final copper face plate hence, its type-face 4 is composed of appropriately assembled type, cuts, etc.

The mold frame 7, shown in FIGS. 1–3, is composed of oppositely disposed end members 8, 9 and side members 10, 11. The mold frame 7 has a top face 12 corresponding to the type-face 4 of the type-form and terminating in inner and outer endless edges 13 and 14.

Conventional method

One conventional method of producing electrotype printing plates comprises: first, taking a plastic impression of the top face of the galley mold-frame assembly; second, electrodepositing a shell over that plastic impression; third, marginally trimming the electrodeposited shell to precise size; fourth, backing a cylindrical series of such shells to form a rigid cylinder wherein the back faces of the shells cooperatively provide the bore of the cylinder; and fifth, converting that cylinder into several rigidly-backing printing plates.

First step.—The plastic impression step is performed by (1) covering the type-face 4 of the type-form 3 and the adjacent top face 12 of the mold-frame 7 with a .030 to .040" thick thermoplastic sheet 16, (2) placing, over one end margin of plastic sheet 16, an electrical contact tab (not shown), which will be used in the electroplating phase of the operation, (3) heating the plastic sheet 16 and the galley mold-frame assembly (as a unit) to soften the plastic sheet; (4) compressing that heated unit so that the plastic sheet 16 is pressed downwardly against the type-face 4, bearer 5 and mold-frame 7 (a) to provide the impression face 17 of the sheet 16 with a single impression accurately reproducing all indentations in the entire pattern face of the type-form and the top faces of the bearer and mold-frame, and (b) to secure the electrical contact tab to the sheet; (5) cool the sheet 16 and the galley mold-frame assembly to set the indentations or impression in the impression face 17 of the plastic sheet; and (6) remove the indented plastic sheet 16 together with its tab from the assembly.

Second step.—The electroplating step is performed by (1) hand brushing a cleaning solution over the flat indented face 17 of the sheet 16 and rinsing that face, (2) spraying the rinsed face (a) first with a stannous chloride solution and next (b) with a silver solution, which makes it electrically conductive, (3) mounting the silver-coated plastic sheet in a case, which, for arcuate plate production, is cylindrically arced to hold the plastic sheet 16 to a desired cylindrical curvature with its smooth face and its (negatively) indented face 17 respectively facing convexly outward and concavely inward, (4) electroplating a "copper" shell 19 over the inner concavely-curved silver-coated indented face of the plastic sheet (a) with a heavy coat of bright copper (1 hr.), (b) with a light coat of another copper (10 min.), and (c) with a flash coat of tin, (5) removing the composite copper-shell-coated plastic sheet 16 from the case, and (6) stripping the outer plastic sheet 16 from the inner electrolytically-deposited copper shell 19.

The outer silver-coated convex face 20 of the copper shell 19 has embossments 21 corresponding to a positive or identical reproduction of the type-face 4. This convex face 20 will constitute the printing face of the final printing plate.

The inner tin-coated concave face 22 of the shell 19 has indentations corresponding but opposite to the embossments 21. This concave face 22 must be backed to strengthen the convex printing face 20. The conventional backing step follows the conventional trimming step.

Third step.—The trimming step, which separates the excess margins 23 of the shell 19 from its face plate portion 24 along interposed trim lines, requires 4 operations which are performed in two metal shearing machines: (1) one curved edge of shell 19 is precisely aligned in, centered in and trimmed by one metal shearing machine whereupon the shell is reversed lengthwise so that its opposite end edge may be precisely aligned in, centered in and trimmed by the same machine; and (2) one long straight side edge of the shell 19 is precisely aligned in, centered in and trimmed by the second metal shearing machine whereupon the shell is reversed widthwise so that its opposite long straight side edge may be precisely aligned and centered in and trimmed by the second machine.

If the curved end and straight side edges of the shell 19 are not properly aligned in the shearing machines with the proper trim lines for the trimming operations, the trimmed copper face plate 24 will not be properly trimmed. Again, if such trimmed edges are not precisely spaced from the printing portion of the copper face plate 24, the latter will be offset one way or another from its proper place. These inaccuracies are objectionable.

Fourth step.—The backing step is performed by (1) securing a cylindrical series of trimmed copper face plates together to form a "face cylinder" of predetermined diameter, this being done by connecting the long side edge of each copper face plate to the adjacent side edge of the next copper face plate in the cylindrical series, (2) fitting the "face cylinder" snugly to the bore of a cylindrical metal-form, (3) rotating the cylindrical metal-form while feeding a charge of molten lead into the tin-coated interior of its "face cylinder" whereby the lead is (a) not only centrifuged into a corresponding cylindrical form, but also (b) simultaneously forced into the tin-coated indentations of the bore of the copper face cylinder and (4) continuing the rotation of the metal-form until the lead solidifies and bonds to said tin-coated bore to form a rigid cylinder.

Fifth step.—The conversion step is performed by cutting the lead cylinder axially along opposite long sides of each printing face plate to separate that cylinder into individual electrotype printing plates which are then more or less ready to be mounted in the appropriate plate cylinder of a printing press.

Inventive structure

In accordance with the preferred embodiment of my invention, the front or top face 12 of the mold frame 7 is provided (on at least one of its side or end members and preferably on all four of such members) with a sharp trim line ridge extending precisely along a path or trim line accurately reproducing the precise length and width boundary edges of the final copper face plate portion 24 of the copper shell 19. While the trim line ridge may be provided in the mold-frame 7 in any desired way, I prefer to provide each ridge in the manner illustrated in the drawings.

Accordingly, each of the end members 8, 9 and of the side members 10, 11 of the mold-frame 7 is provided with the corresponding end and side sections of an endless groove 30. Each section of groove 30 is fashioned to receive (and be filled by) an insert 31, the top or front face of which is machined along its inner margin to provide it with a valley 32 and an adjacent ridge 33. By terminating the inner side wall of the trim line ridge 33 at the inner margin of the insert 31, then the inner side walls of a given trim line ridge 33 and of groove 30 cooperate to form a valley 34 when the insert is positioned in the groove. The insert 31 may be mounted in any suitable way. Thus, it may be screwed rigidly to the mold-frame 7. Each trim line ridge 33 of insert 31 provides the mold-frame 7 with a precise reproduction of the corresponding trim line of the copper shell 19 and of the corresponding edge of the final face plate 24.

New method

With the mold-frame 7 constructed in accordance with the preferred embodiment of this invention, an electrotype printing plate may be produced by the conventional practice of the conventional method, as hereinbefore explained, except that the 3rd step is eliminated since the trimming operation will now be performed automatically in the performance of the stripping phase of the 2nd step.

Accordingly, the 1st step is conventionally performed to take a plastic impression of the top face of the galley mold-frame assembly. In performing the 1st step, the plastic sheet 16 is conventionally provided with the same plastic impression as before. In addition, its indented impression face 17 is provided with a negative or reverse reproduction of the valleys 32, 34 and trim line ridge 33 in the mold-frame insert 31; hence, with two ridges 32′, 34′ and an interposed valley 33′ along each side and end. It will be understood that the bottom of an endless valley 33′ extends along an endless path accurately reproducing the precise length and width boundary edges of the final copper face plate portion 24 of shell 19.

Now, when the 2nd step is conventionally performed, a copper shell 19 will be conventionally produced. This copper shell will follow the contour of the impression face 17 of the sheet 16; hence, will extend over and conform to the ridges 32′, 34′ and the interposed valley 33′ of the plastic sheet. At the bottom of the valley 33′, the thickness of the electrodeposition on the plastic sheet will be substantially decreased and correspondingly weakened. As a consequence, when the copper shell 19 is stripped from the plastic sheet 16, which occurs during the last stages of the 2nd step, the shell will contemporaneously (and more or less automatically) be torn and separated along its boundary line of reduced thickness as seen in FIG. 8. Thus, the excess margin 23 of the copper shell is accurately removed from the shell while the remaining copper face plate portion 24 of that shell is so precisely trimmed that no further trimming operation is necessary. The fact that the line of reduced electrodeposition precisely locates one or more of the desired trim lines of the copper shell is advantageous even when the trimming step is performed as a separated step following the stripping operation.

This new method of producing electrotype plates may now be completed by conventionally performing the 4th and 5th steps as hereinbefore explained. Obviously, this invention is suited for use in producing flat electrotype copper face plates.

My invention makes use of the well known phenomenon that the thickness of the electrodeposition, which obtains on the high points of a deposit-receiving surface, is inherently greater than the thickness of the electrodeposition in the depressions and that, where the receiving surface presents angle-forming flat surfaces, the difference between the maximum and minimum thickness of the deposition in each angle (and the ratio of the average thickness of the deposition in each angle to the minimum thickness thereof), will increase as the angles decrease with the minimum thickness occurring at the apex of each angle. (See the 1955 Electroplating Engineers Handbook, pps. 59–64; and the 1969 Metal Finishing Guide Book-Directory, pps. 466–469).

In the practice of my invention, the base of the mold-frame trim line ridge 33 may terminate at or adjacent the face plane of the top face 12. I prefer, however, to groove the top face of the mold-frame (or its insert 31) and to provide the trim line ridge 33 within that groove. This results in flanking the trim line ridge 33 with sharp angled valleys 32 and 34.

In the preferred practice of my invention, I have obtained excellent results by using a mold-frame trim line ridge 33 dimensioned to form a plastic sheet valley 33′, having a mouth width of 4/64″ and a depth of 3/64″; hence, an angle approximately 67°. While the magnitude of this angle may vary over a wide range, it should be kept low enough to insure a sharp line of cleavage. I suggest an angle ranging from about 50° to about 85°. A sharp internal angle of this character constitutes a means operative, during the electroplating operation, for substantially reducing the thickness of the copper shell deposit on the plastic impression along a line corresponding to the bottom of the valley. It will be appreciated that it is a relatively simple matter to position the elongate ridge on the mold-frame at whatever location is required to place the elongate bottom of the valley on the plastic sheet at a location such that the line of reduced electrodeposition constitutes an accurate reproduction of the corresponding trim line required in the shell to produce the boundary edge desired in the copper face plate.

The plastic sheet ridges 32′, 34′ cooperate with each other to form the valley 33′. Each of these ridges individually cooperates with the plastic body 16 to form a sharp right angle, which also tends to reduce the thickness of the corresponding portion of the copper shell and thus promote undesirable tearing particularly near the corners of the trim line. To avoid this, it is desirable to increase the magnitude of that 90° angle either by slanting the unslanted side of each of the ridges 32′, 34′ or by providing the plastic body 16 with a slight chamfer extending across each of the two 90° corners.

Accordingly, the mold frame 7 is chamfered at the inner side of groove 30 and valley 34, this chamfer being designated 35 in FIG. 2 where it is best seen. Similarly, the mold-frame insert 31 is identically chamfered at the outer side of valley 32, this chamfer being designated 36 in FIG. 4 where it is best seen. Now, when the impression is taken, the plastic body 16 will be correspondingly chamfered at 35′, 36′ and, when the shell is deposited as seen in FIGS. 7–8, its thickness adjacent chamfers 35′, 36′ will not be dangerously reduced.

Having described my invention, I claim:

1. In apparatus for producing trimmed printing face plates, an improved assembly, of the type intended to contain a type-form for use in producing an electro-type printing face plate through the agency of a copper shell electroplated on the impression face of a sheet plastic mold, comprising:

(A) a galley tray to support a type-form with its type face up, (1) said tray having upright perimetric walls;

(B) a bearer on the tray snugly interposed in the space between a tray-supported type-form and the perimetric walls of the tray, (1) said bearer projecting upwardly away from the tray;

(C) a vertically-open mold-frame of "window-frame' shape having a top face at the level of the type face of a tray-supported type form, a bottom face, and, between its top and bottom faces, side and end members extending around an open-ended central opening, which is to receive said tray and its type-form through its bottom face, the bore wall of said opening having (1) an upper wall portion to engage the corresponding wall portion of the bearer of a received assembly, and (2) a lower wall portion which is cut away to provide a downwardly and inwardly open recess for receiving the perimetric walls of the tray of said assembly; and (D) means providing the top-face surface of one or more of said mold-frame side and end members with an elongate trim line ridge of inverted V cross-section for impressing an elongate V-shaped valley into the impression face of said sheet plastic mold when that plastic mold is used to take an impression of said type-form.

2. The improvement of claim 1 wherein:

(A) the internal angle of said ridge on the mold frame, is within a range extending from about 50° to about 85°.

3. The improvement of claim 1 wherein:

(A) said mold-frame contains an elongate groove in its top face; and (B) an elongate insert is provided for said groove, (1) said insert containing said ridge.

References Cited

UNITED STATES PATENTS

| | | | |
|---|---|---|---|
| 2,622,054 | 12/1952 | Franklin | 18—DIG. 52 |
| 3,183,285 | 5/1695 | Boylan | 18—36 X |
| 3,192,567 | 7/1965 | Abernethy et al. | 18—36 |
| 2,661,498 | 12/1953 | Blaurock | 18—36 |
| 3,353,220 | 11/1967 | Lenoble | 18—36 |

ROBERT L. SPICER, Jr., Primary Examiner